(12) United States Patent
Cheung et al.

(10) Patent No.: US 8,666,547 B2
(45) Date of Patent: Mar. 4, 2014

(54) CELLULAR AUTOMOTION DIGITAL MATERIAL

(75) Inventors: Kenneth C. Cheung, Boston, MA (US); Ara Knaian, Newton, MA (US); Neil Gershenfeld, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 698 days.

(21) Appl. No.: 12/732,184

(22) Filed: Mar. 25, 2010

(65) Prior Publication Data

US 2010/0292836 A1 Nov. 18, 2010

Related U.S. Application Data

(60) Provisional application No. 61/163,329, filed on Mar. 25, 2009.

(51) Int. Cl.
*G06F 19/00* (2011.01)
*B25J 19/00* (2006.01)

(52) U.S. Cl.
USPC .......... 700/248; 700/250; 977/720; 977/963; 901/1; 901/50

(58) Field of Classification Search
USPC ............... 700/246–250, 253, 262; 901/1, 50; 977/720–722, 963
See application file for complete search history.

(56) References Cited

U.S. PATENT DOCUMENTS

| | | | |
|---|---|---|---|
| 4,608,525 A * | 8/1986 | Mori et al. ................ 700/248 |
| 5,523,662 A * | 6/1996 | Goldenberg et al. .... 318/568.11 |
| 6,084,373 A * | 7/2000 | Goldenberg et al. .... 318/568.11 |
| 6,568,869 B1 * | 5/2003 | Murata .......................... 403/52 |
| 6,575,802 B2 * | 6/2003 | Yim et al. ................. 318/568.11 |
| 6,605,914 B2 * | 8/2003 | Yim et al. ................. 318/568.11 |
| 6,636,781 B1 * | 10/2003 | Shen et al. .................... 700/248 |
| 6,686,717 B2 * | 2/2004 | Khairallah ............... 318/568.11 |
| 6,870,343 B2 * | 3/2005 | Borenstein et al. ...... 318/568.16 |
| 7,567,854 B2 * | 7/2009 | Desmond ...................... 700/245 |
| 2002/0053893 A1 * | 5/2002 | Khairallah ................. 318/568.1 |
| 2002/0190682 A1 * | 12/2002 | Schempf et al. ......... 318/568.11 |
| 2003/0097203 A1 * | 5/2003 | Michael ........................ 700/247 |

(Continued)

OTHER PUBLICATIONS

PCT International Search Report and Written Opinion, PCT Pat. App. Ser. No. PCT/US2010/028763, mailed Sep. 29, 2010.

*Primary Examiner* — Jason Holloway
(74) *Attorney, Agent, or Firm* — Norma E. Henderson

(57) ABSTRACT

Cellular automotion digital material is useable for rapid prototyping and fabrication of continuous string conformations and two- or three-dimensional shapes through actuation of a string, surface, or volume composed of identical discrete units. Each unit is an actuated joint having a single degree of freedom. The actuated joint includes a two-part actuator having an inner active portion and an outer passive portion that are controllably rotatable relative to each other, the outer portion being configured to fit within the housing of an adjacent cellular automotion unit, and a linkage element that includes a main strut and a housing and is connected to the actuator by a pin connector. The housing is configured to house the actuator of an adjacent cellular automation unit, and the opening in the strut is rotated about the axis of symmetry of the cellular automotion unit relative to the opening in the housing so that the alignment of the cellular automotion unit will be rotated with respect to the alignment of any adjacent unit. The cellular automotion unit may include an on-board processor for controlling actuation of the cellular automotion unit.

19 Claims, 14 Drawing Sheets

(56) References Cited

U.S. PATENT DOCUMENTS

| | | |
|---|---|---|
| 2006/0052664 A1 | 3/2006 | Julian et al. |
| 2006/0095159 A1* | 5/2006 | Desmond ..................... 700/245 |
| 2006/0261771 A1* | 11/2006 | Anhalt et al. ............ 318/568.12 |
| 2007/0258329 A1 | 11/2007 | Winey |
| 2008/0126047 A1 | 5/2008 | Lukis et al. |
| 2008/0281231 A1* | 11/2008 | Jacobsen et al. .............. 600/585 |
| 2009/0056802 A1 | 3/2009 | Raban |

* cited by examiner

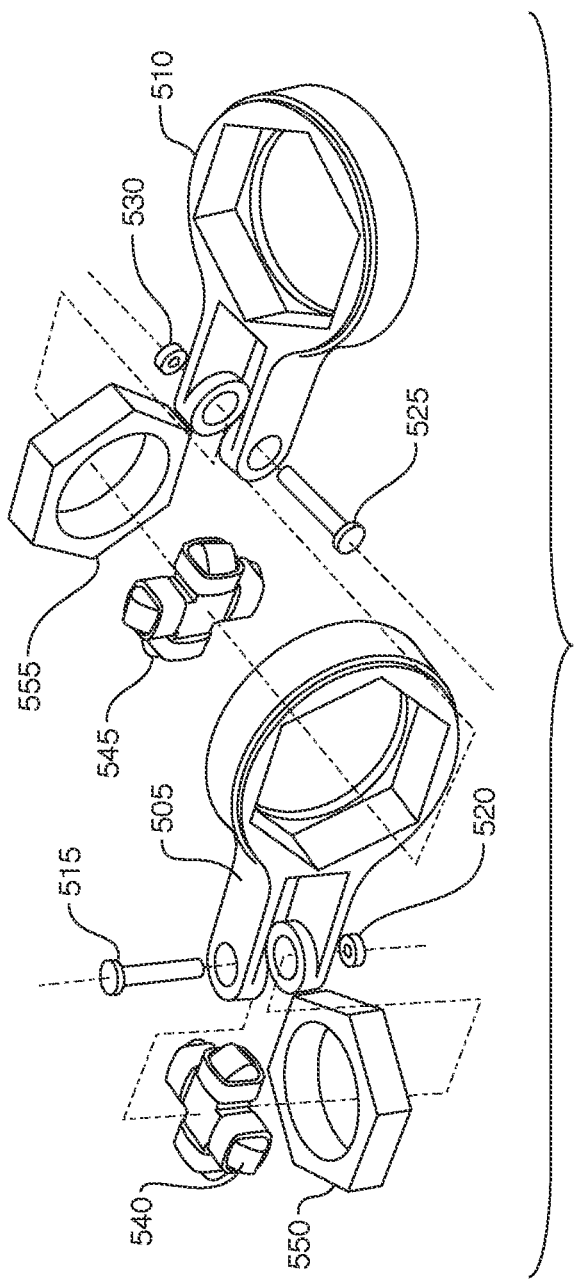

CELLULAR AUTOMOTION DIGITAL MATERIAL

RELATED APPLICATIONS

This application claims the benefit of U.S. Provisional Application Ser. No. 61/163,329, filed Mar. 25, 2009, the entire disclosure of which is herein incorporated by reference.

STATEMENT REGARDING FEDERALLY SPONSORED RESEARCH OR DEVELOPMENT

This invention was made with U.S. government support under Grant Number W911NF-08-1-0254, awarded by the Army Research Office. The government has certain rights in this invention.

FIELD OF THE TECHNOLOGY

The present invention relates to digital materials and, in particular, to digital material for rapid prototyping and fabrication of continuous string conformations and two- or three-dimensional shapes through actuation of a string, surface, or volume composed of identical discrete units.

BACKGROUND

The fields of rapid prototyping and fabrication have generally sought to achieve scalable shape-making methods through digital means. Prior machines in the field have employed digital computation and communication algorithms to control analog mechanical equipment that additively or subtractively forms shapes from analog bulk material. Use of digital materials instead of the analog materials in current schemes could permit rapid prototyping and fabrication of any shape using simple, identical discrete units.

Many chain, spine, or snake robots have been proposed in the past, but few rely on simple units with low degrees of freedom per unit. The fields of reconfigurable and modular robotics have also explored devices that perform global approximations of folding or change in density, but prior work does not demonstrate a design with the ability to perform these changes using a continuous structure of simple, discrete, and identical components. Prior work also does not show a system with the geometric and mechanical ability to form any two-dimensional or three-dimensional shape.

While the field of distributed control systems has explored distributed algorithms for configuration and motion planning, little work has shown the use of a computationally universal in-band cellular automata for global control of devices consisting of very simple discrete units. Test cases exist for cellular automata-based task completion algorithms, such as locomotion with obstacle avoidance, that use complex and highly specialized mechanical components and devices, but neither generalized computational nor generalized mechanical models have previously been proposed.

The field of medicine seeks conformational devices that can be built at small scales and meet specific biocompatibility and imaging environment requirements, thus requiring designs that can be easily adapted to a wide range of materials. Also of interest in the medical field are devices that are deployable and meet very specific strength and conformation requirements. In addition, many other fields, such as optics, haptics, aerodynamics, and hydrodynamics, also have applications that call for reconfigurable and highly precisely shaped surfaces, ranging from kilometer scale solar or radio reflectors to meter scale vehicle control surfaces, to active and adaptive objects with micron scale features.

SUMMARY

A cellular automotion device according to the present invention consists of continuous structures of simple discrete units, or cells, which units are collectively called "cellular automotion digital material". In one aspect of the invention, a cellular automotion unit is an actuated joint having a single degree of freedom. The actuated joint includes a two-part actuator having an active portion and an outer passive portion that are controllably rotatable relative to each other, the outer passive portion being configured to fit within an actuator housing portion of an adjacent cellular automotion unit, and a linkage element that includes a main strut portion and a housing and is connected to the actuator by a pin connector. The housing is configured to receive and house the actuator of an adjacent cellular automation unit, and the opening in the strut portion is rotated about the axis of symmetry of the cellular automotion unit relative to the opening in the housing so that the alignment of the cellular automotion unit will be rotated with respect to the alignment of any adjacent unit. The cellular automotion unit may include an on-board processor for controlling actuation of the cellular automotion unit and/or communications circuitry.

In another aspect of the invention, a cellular automotion device is a continuous structure comprising a set of discrete cellular automotion cells, wherein each cellular automation cell is linked to at least one adjacent cellular automotion cell and has a range of motion that is rotated with respect to the range of motion of the cellular automotion cells to which it is linked, each cellular automotion cell comprising an actuated joint, the actuated joint having a single degree of freedom. The cellular automotion cells may be linked together into a chain such that the device is a cellular automotion string. In some embodiments, at least some cellular automotion cells are linked to each other by passive elastic nodes that provide the cellular automotion device with the ability to achieve a branching topological arrangement of cellular automotion cells. The cellular automotion device may comprise cellular automation cells and passive elastic nodes linked together into a two-dimensional shape such that the device is a cellular automotion surface. The cellular automotion device may comprise cellular automation cells and passive elastic nodes linked together into a three-dimensional lattice such that the device is a cellular automotion volume.

BRIEF DESCRIPTION OF THE DRAWINGS

Other aspects, advantages and novel features of the invention will become more apparent from the following detailed description of the invention when considered in conjunction with the accompanying drawings wherein:

FIG. 5 is an exploded diagram of an exemplary embodiment of a cellular automotion string assembly employing the cells of FIGS. 4A-D, according to one aspect of the invention;

DETAILED DESCRIPTION

A cellular automotion device according to the present invention consists of continuous structures of very simple discrete units, or cells, which units are collectively called "cellular automotion digital material". Cellular automotion digital material has a low degree of freedom per unit, making the units good candidates for trivial adaptation to various materials at a small scale. The nature of the cellular automotion device is highly tunable in terms of its shape, density, and other properties. The ability of the cellular automotion device to reach arbitrary conformations with parallel actuation makes it particularly suitable for application as a self-bending or self-folding surface.

Cellular automotion devices according to the invention employ a cellular computation model that is computationally universal, as well as geometric mechanical (geomechanical) models that are fabricationally universal. They can perform any algorithm and conform to any shape. Global configuration and motion of the device is a result of the information flow through the system, and this computational system allows access to any geomechanically valid continuous motion between configurations.

As used herein, the following terms expressly include, but are not to be limited to:

"Cellular Automotion Digital Material" means digital material useable for rapid prototyping and fabrication of any continuous string conformation, or any continuous two-dimensional or three-dimensional shape, through actuation of a string, surface, or volume composed of identical discrete units.

"Cellular Automotion Digital Unit", "Cellular Automotion Unit", and "Cellular Automotion Cell" all mean a single, discrete unit of digital material.

"Cellular Automotion Device" means a structure fabricated from digital material, such as a string, surface, or volume composed of identical discrete units.

Figure 1:
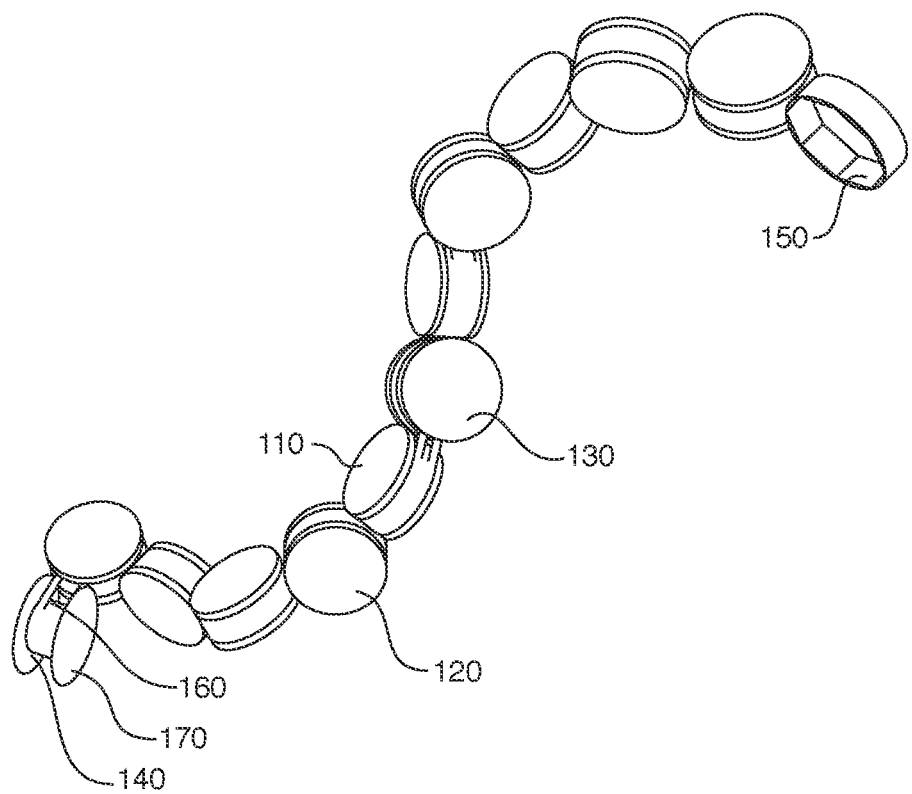
FIG. 1 is an exemplary embodiment of a cellular automotion string, according to one aspect of the invention.

A cellular automotion string is an example of a cellular automotion device that is a continuous structure of discrete units of a single unit type. Each unit is a single actuated joint having a single degree of freedom. FIG. 1 is an exemplary embodiment of a cellular automotion string, according to this aspect of the invention. Other types of cellular automotion devices include, but are not limited to, cellular automotion surfaces, such as the exemplary embodiment depicted in FIG. 2, and cellular automotion volumes, such as the exemplary embodiment depicted in FIG. 3. As shown in FIG. 1, each unit is a rotational joint with a single rotational degree of freedom).

Referring to the exemplary cellular automotion string depicted in FIG. 1, for each unit "n" 110, each adjacent unit "n−1" 120 and "n+1" 130 has a range of motion that is set to be orthogonal to the range of motion of unit "n" 110 about the axis along the cellular automotion string. This orthogonal alternating of axes of motion along the string allows for a wide range of possible global conformations of the cellular automotion string. In an exemplary embodiment, each unit 110, 120, 130 includes a two-part actuator 140, 150, linkage 160, and on-board processor 170.

Two preferred unit geometries, the hexagonally bisected cube and the right-angle tetrahedron, allow tight packing of the string to fill any continuous three-dimensional volume. The existence of a packing arrangement that can be formed by continuous motion from an extended string without self intersection has been mathematically proven (Cheung, Demaine, & Griffith, "Programmable Assembly with Universally Foldable Strings", submitted for publication, 2010). For the exemplary embodiment described herein, when this is most efficiently done, the final arrangement of the units correspond to close-packed spatial tiling of cubes.

As assemblies of these one degree of freedom components, cellular automotion devices are able to form Euclidean as well as non-developable surface forms, such as spherical or hyperbolic shells with programmable porosity. Also novel to the fields of reconfigurable and modular robots is the ability of these devices to perform all of the global programmed behaviors of volumetric shearing, bending, compression, and extension, with the same basic material. The cellular automotion device therefore meets the demands of emerging "soft robotics" applications.

The dynamic shape change capability of a cellular automotion string allows for highly adaptive locomotion and manipulation. By continuously changing its shape, a cellular automation string can slither like a snake, form legs and walk over ground, or form one or more wheels and roll over ground. A cellular automotion string can deploy hooks or fingers and use them to climb up the side of rocks, buildings, or furniture. A cellular automotion string can configure itself into a thin string and pass itself through a small hole, then configure itself back into a useful shape on the other side. As an example medical application, a cellular automotion string could pass itself through the circulatory system as an unfolded string, and then configure itself into a diagnostic or surgical tool when needed. As an example building repair application, a cellular automotion string could be pass itself through wiring conduits, plumbing pipes, or holes in the wall of a building, then configure itself into a construction tool (e.g. saw, screwdriver, wire stripper) as needed to make the needed repairs without making large holes in the wall for access.

According to one aspect of the invention, in order to program a string to form any shape, start with any common three-dimensional CAD file (i.e. binary stereo-lithography file, describing a three-dimensional mesh as a collection of vector facets) evaluated over a lattice. Then, a Hamiltonian path is constructed using this lattice, which is processed into the code for the string. Each unit in the actual folding process solves for a local solution at each time step—the global solution is a product of the aggregated local results of the programs of each unit. This program is as simple as: "turn left or right until you touch your previous neighbor," or "turn about your x, y, or z axis until you touch your previous neighbor."

FIGS. 4A-D present four views of an exemplary embodiment of a cellular automotion string cell, according to one aspect of the invention. In this embodiment, the unit has three main components. Actuator 405 has two parts that controllably rotate relative to each other. Pin connector 410 fixes main strut/housing part 415, 420 to one part of actuator 405. The other part of actuator 405 is then fixed in the housing part of the next unit. The rotational alignment of the opening in the strut 415 relative to the housing 420 is ninety degrees about the axis of symmetry of the part.

Assembly of the units of FIGS. 4A-D as a string is shown in FIG. 5. Upon assembly, each main strut/housing part 505, 510 is rigidly fixed via pin connector parts 515, 520, 525, 530 to the active part 540, 545 of the respective actuator. The passive part 550, 555 (e.g. a stator) of each actuator is fixed within the housing part of the previous unit. In this way, when assembled, the units are locked together like a chain, with their freedom of motion defined by the actuator.

In order to assemble an entire string, the actuators are assembled with active portions 540, 545 inside the respective passive portions 550, 555. Then the assembled actuators are inserted inside each housing portion of main strut/housing part 505, 510. In a preferred embodiment, passive parts 550, 555 press fit into housings 505, 510, but it will be clear to one of skill in the art that adhesive, fasteners, or any other attachment method known in the art may be advantageously employed for this purpose. Next, these assemblies are chained by inserting them into the strut portions of each following assembly, and fixing the rotor element of the actuator to the strut portion with pin fasteners 515, 520, 525, 530.

In a preferred embodiment of the exemplary devices of FIGS. 1, 4A-D, and 5, a toothed electropermanent wobble stepper motor is used as the actuator. The motor is assembled together (i.e. active portions 540, 545 are assembled inside the respective passive portions 550, 555), as the toothed rotor is profiled to self-center within the toothed toroidal inner profile of the stator. The strut portion of main strut/housing part 505, 510 contributes to restricting the motion of each unit to the single desired degree of freedom. It will be clear to one of skill in the art that many other types of motors could be used for actuating the joint, including, but not limited to, electric motors, pneumatic motors, hydraulic motors, and internal combustion motors. Within the category of electric motors, many types could be used, including, but not limited to, DC servo motors, geared motors, and stepper motors.

Figure 7:
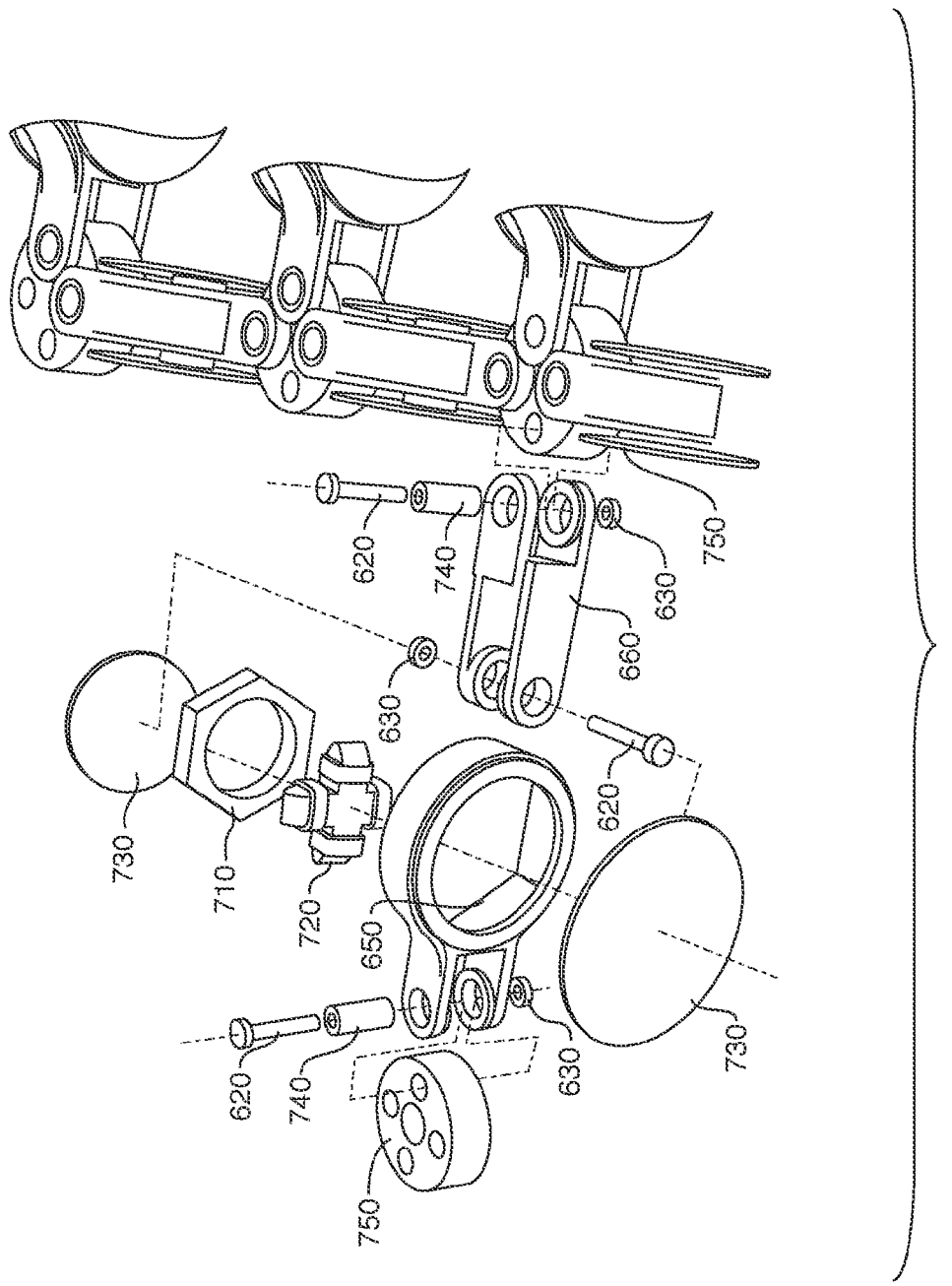
FIG. 7 is an exploded diagram of an exemplary embodiment of a cellular automotion surface assembly employing the cells of FIGS. 6A-D, according to one aspect of the invention.

The conformation and locomotion of the cellular automotion string—global programmed shape and motion—is achieved through local actuation of the individual units. The control of these individual units is achieved through cellular logic automata control, whereby each unit contains minimal processing power in order to handle a low number of digital states and the global configuration and locomotion is a result of the information flow through the system, as defined by the pre-programmable and re-programmable system of states of the device. The hardware for this computation may be integrated into main strut/housing part 505, 510, or placed on a board that is fixed to this part as part of the final assembly. In general, care should be taken to ensure that this board does not unduly restrict the range of motion (270 degrees) of each unit when finally assembled. An example of such a board appropriately placed is shown in FIGS. 6 and 7. Wires to carry power and communications may then follow the rigid connection from the strut/housing to the rotor, and via flexible cabling between units.

It will be clear to one of skill in the art that the described embodiment is exemplary only, and that many other configurations will be suitable for use in the present invention. In some embodiments, node control is achieved by means other than a cellular automaton; for example, but not limited to, by using a stored-program computer, such as, but not limited to, a microcontroller, on each node or on a subset of the nodes. Connections between the nodes can be wired, integrated onto a flexible printed-circuit backplane, or wireless. Applicable wireless communication technologies include, but are not limited to, RF, optical, near-field magnetic, and near-field electric field communication. For some applications, it may be desirable to limit the range of global configurations by changing the relative rotational position of the connection to adjacent units, in terms of yaw, pitch and roll, as well as the relative length of the connecting strut.

It should be clear to a person skilled in the art that many physical processor or drive variants are possible. Interconnect, for communication between units, would vary appropriately. For example, conventional microprocessors may be used, with optical interconnect, or bubble logic processors with flexible tubular interconnect may be used for applications where tolerance to electromagnetic noise is a concern. For actuators, hydraulic motors may be used in applications at the meter length scale, or bi-stable electromagnetic motors may be used in applications at the nanometer length scale.

The topology of a cellular automotion device may be branched assemblies of smaller cellular automotion strings, with rigid or elastomeric interstitial connections, as necessary to achieve desired range of configurations. In one exemplary embodiment, called the cellular automotion surface, a continuous structure of discrete units forms the device, whereby units (each unit being defined as a single actuated joint with low degrees of freedom, with local control) are connected to each other via passive elastic nodes, as shown in FIGS. 6A-D. As such, the units are used to form an arbitrarily large sheet of material, which comprises the device. An exemplary embodiment of a cellular automotion surface is depicted in FIG. 2.

Figure 2:
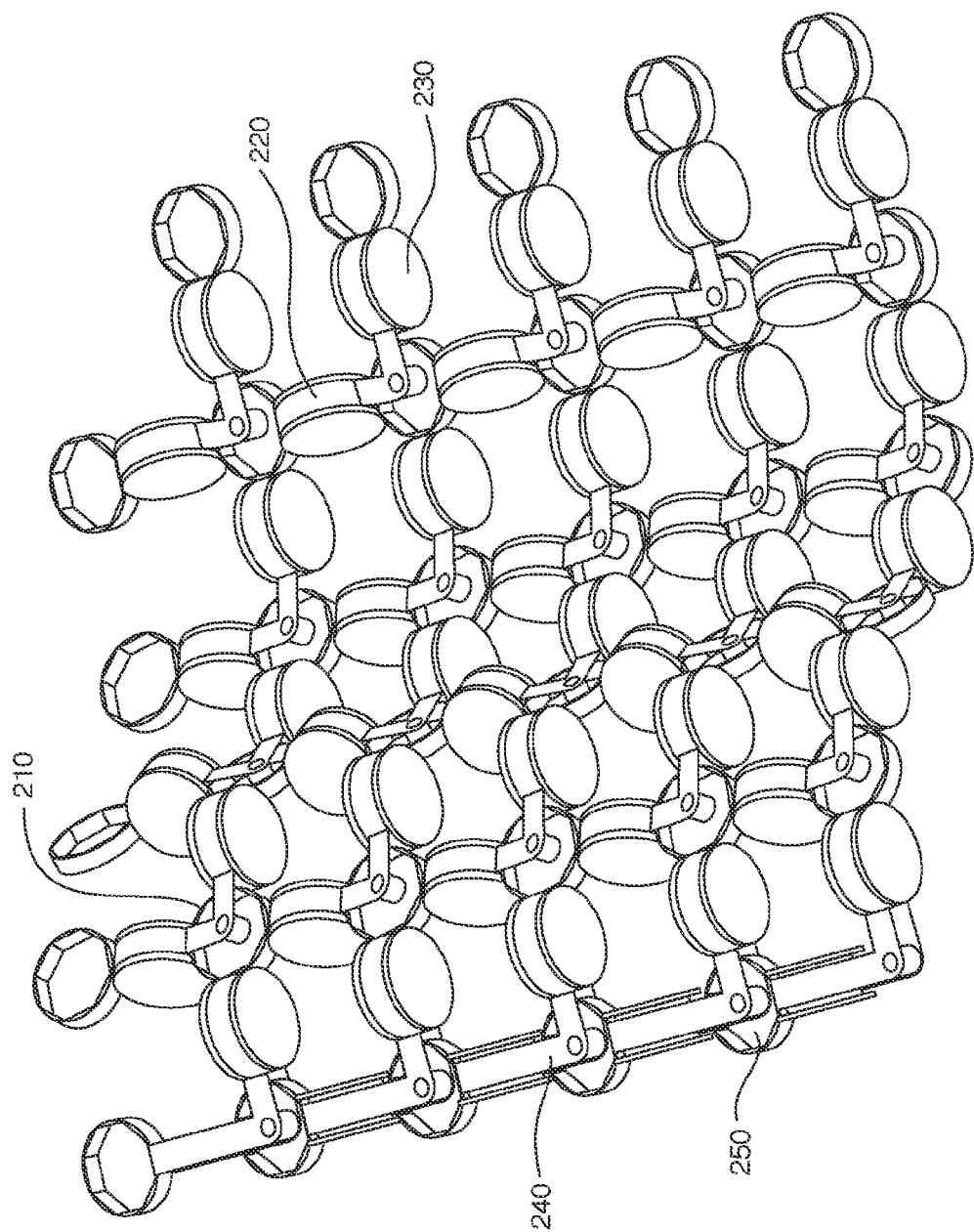
FIG. 2 is an exemplary embodiment of a cellular automotion surface, according to one aspect of the invention.

In FIG. 2, individual units are assembled such that all units actuate in a direction that is normal to the surface of the sheet, with alternating position, in terms of yaw, but consistent roll and pitch relative to the surface normal, such that actuation of neighboring units in the same direction may result in global folds, and actuation in alternating directions may result in shrinkage or reduction of linear dimension along the surface. This is enabled by the elastic nodes, and permits the device to form non-Euclidean, non-developable surface forms, such as spherical or hyperbolic shells with programmable porosity. Labeled in FIG. 2 are node element 210, link element (x-direction) 220, link element (y-direction) 230, strut 240, and elastomer 250.

There are three main components to each unit, as shown in the exemplary embodiment depicted in FIGS. 6A-D. Actuator 610 has two parts, which controllably rotate relative to each other. Pin connectors 620, 630 fix either ends of the main strut/housing part to elastomeric nodes 640. The strut/housing part is made of two linkages 650, 660, which correspond to the two parts of actuator 610 that move relative to each other. Each part of actuator 610 is fixed one of linkages 650, 660. The rotational alignment of the opening in the linkages 650, 660 relative to each other is parallel. Also shown is on-board processor 670.

Assembly of the units of FIGS. 6A-D as a sheet is shown in FIG. 7. Note that upon assembly, the first linkage 650 is rigidly fixed via press fit to stator 710 of the actuator, and the second linkage 660 is rigidly fixed via pin connector parts 620, 630 to rotor 720 of the actuator. In this way, when assembled, the two linkages 650, 660 are locked together like a chain, with their freedom of motion defined by the actuator.

To assemble an entire sheet, the actuators are assembled first, with each rotor 720 inside the corresponding stator 710, and then both are inserted inside the housing portion of primary linkage 650. Next, these assemblies are inserted into the strut portions of secondary linkages 660, and fixed to rotor element 720 of the actuator with pin fasteners 620, 630. Then, the motor coils in rotor 720 may be wired to processor boards 730, and the processor boards fixed to secondary linkages 660 using double sided elastomeric tape. Alternatively, they may be fixed via pin connectors, however it is advantageous to be able to remove these without disrupting the rest of the assembly. Lastly, these assemblies are attached to each other using more pin connectors 630, 640 and bushings 740, and to elastomeric nodes 750, which have holes to accept four subassemblies each. Flexible interconnecting wires may then be added if the system is not designed to harvest its own power and perform wireless communications.

The conformation and locomotion of the cellular automotion surface—global programmed shape and motion—is achieved through local actuation of the individual units. The control of these individual units is achieved through cellular logic automata control, whereby each unit contains minimal processing power in order to handle a low number of digital states and the global configuration and locomotion is a result of the information flow through the system, as defined by the pre-programmable and re-programmable system of states of the device. Instead of each unit having connectivity with two other units, as with the cellular automotion string, units in the cellular automotion surface are connected to as many other units as are defined in the surface topology—four, in the example shown.

It will be clear to one of skill in the art that the hardware for this computation may be integrated into the main strut/housing linkages or placed on board 730 that is fixed to this part as part of the final assembly. If used, care should be taken to ensure that this board does not unduly restrict the range of motion of each unit when finally assembled. Wires to carry power and communications may then follow the rigid connection from the strut/housing to the rotor, and via flexible cabling between units. It may be desirable to alter the range of global configurations by changing the relative rotational position of the connection to adjacent units, in terms of yaw, pitch and roll, as well as the relative lengths of the connecting struts. The topology of a cellular automotion device may be any surface meshing, with arbitrary node connectivity, as necessary to achieve desired range of configurations.

It will be clear to a person skilled in the art that many physical processor, elastic joint, or drive variants are possible. Interconnect, for communication between units would vary appropriately. For example, conventional microprocessors may be used, with optical interconnect, or bubble logic (hydrodynamic flow field) processors with flexible tubular interconnect may be used for applications where tolerance to electromagnetic noise is a concern. For actuators, hydraulic motors may be used in applications at the meter length scale, or bi-stable electromagnetic motors may be used in applications at the nanometer length scale.

Figure 3:
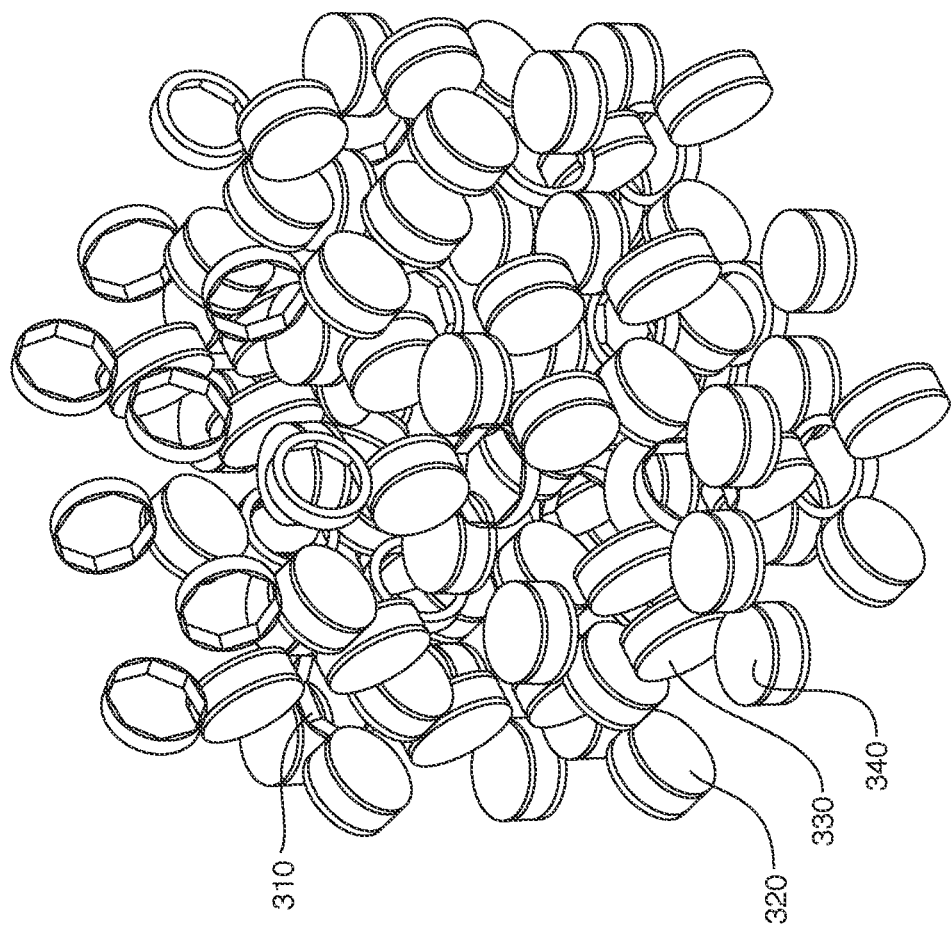
FIG. 3 is an exemplary embodiment of a cellular automotion volume, according to one aspect of the invention.
Figure 4B:
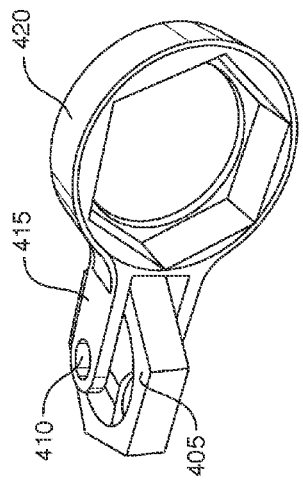
FIGS. 4A-D present four views of an exemplary embodiment of a cellular automotion string cell, according to one aspect of the invention.
Figure 4D:
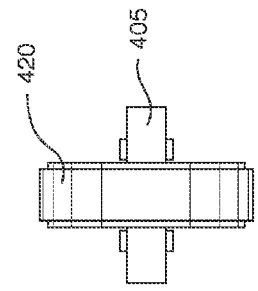
Figure 4A:
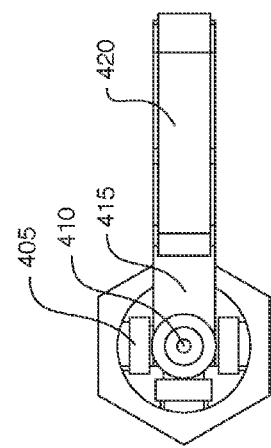
Figure 4C:
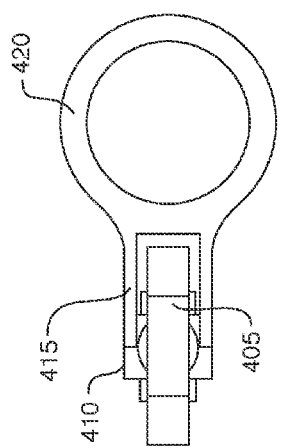
Figure 6B:
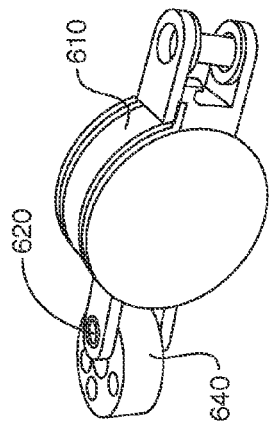
FIGS. 6A-D present four views of an exemplary embodiment of a cellular automotion surface cell subassembly, according to one aspect of the invention.
Figure 6D:
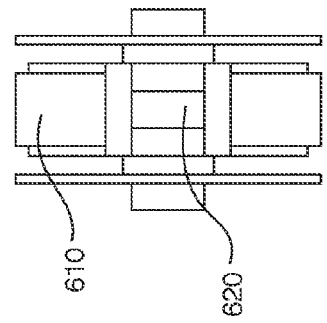
Figure 6A:
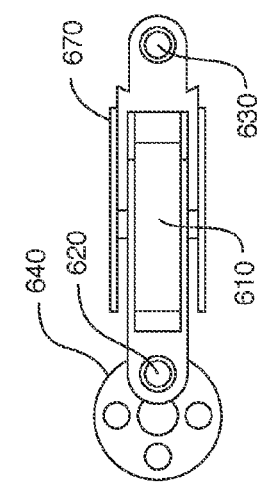
Figure 6C:
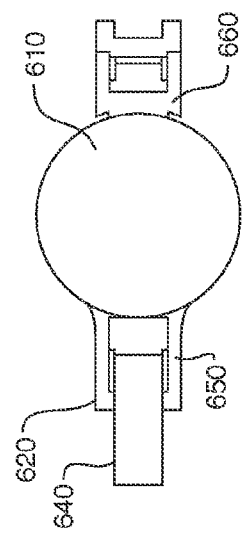

In another exemplary embodiment, called a cellular automotion volume, a continuous structure of discrete units forms a device wherein units, each unit being defined as a single actuated joint with low degrees of freedom and local control, are distributed across a three dimensional lattice, such as is shown in FIG. 3. In FIG. 3, individual units are assembled such that units that actuate in all orthogonal planes are evenly distributed throughout the device. As such, coordinated actuation of units may result in global shearing, bending, compressions, or extension behavior. This is enabled by the elastic nodes, and permits the device to form non-Euclidean spatial topologies, such as foams with programmable density. Labeled in FIG. 3 are node element 310, link element (x-direction) 320, link element (y-direction) 330, and link element (z-direction) 340.

Figure 8A:
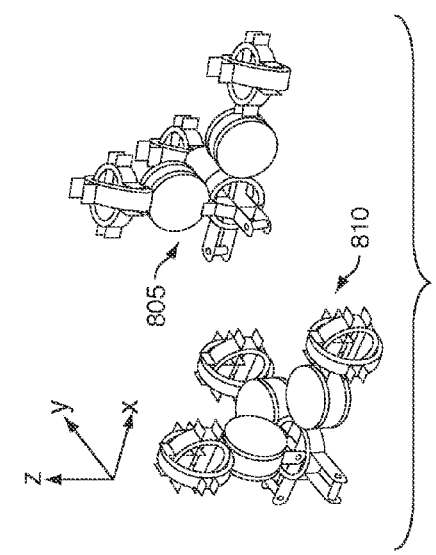
FIG. 8 is an exemplary embodiment of a cellular automotion volume cell subassembly, according to one aspect of the invention.
Figure 8B:
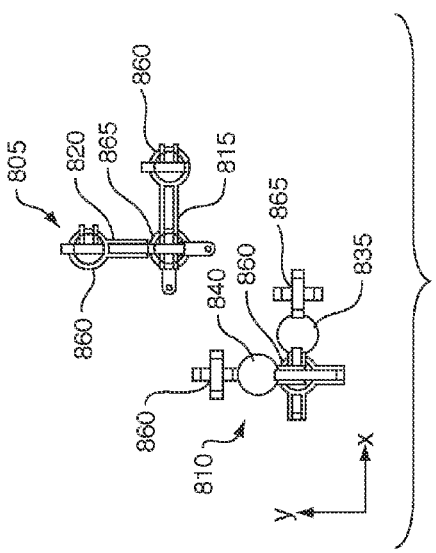
Figure 8C:
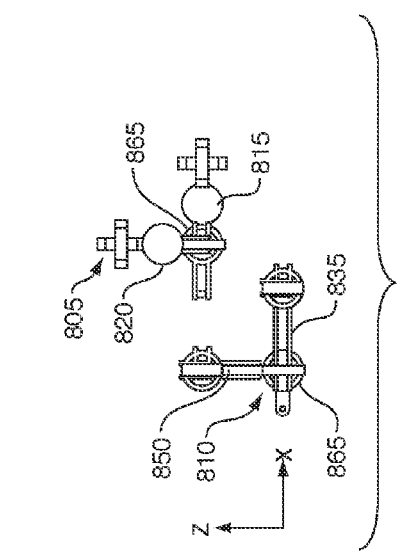
Figure 8D:
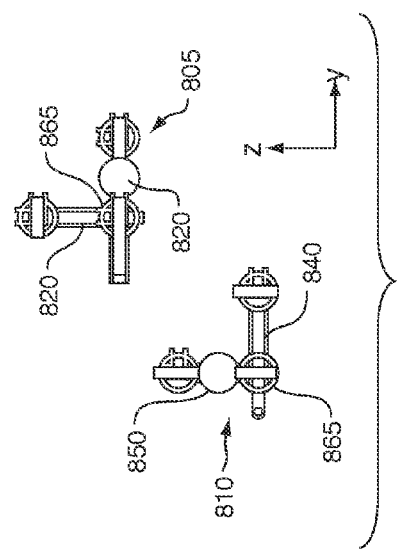

A strategy for assembly of the units as a volume is shown in FIGS. 8A-D. First, the units are combined into small three dimensional subassemblies as shown in FIG. 8A, taking great care to match the rotational orientations of the units, as shown in assemblies M 805, and N 810. These subassemblies of three orthogonal units each, connected by an elastic joint, are joined to form an arbitrarily large volume of material, which comprises the device of FIG. 3, by alternating between the two types 805, 810 in a three-dimensional checkerboard fashion. Any single node within the structure of FIG. 3 will resemble the arrangement depicted in FIG. 9 or its mirror image. Labeled in FIG. 8 are M linkage/actuator X 815, M linkage/actuator Y 820, M linkage/actuator Z 825, N linkage/actuator X 835, N linkage/actuator Y 840, N linkage/actuator Z 850, node housing 860, and elastomeric node 865.

Figure 9:
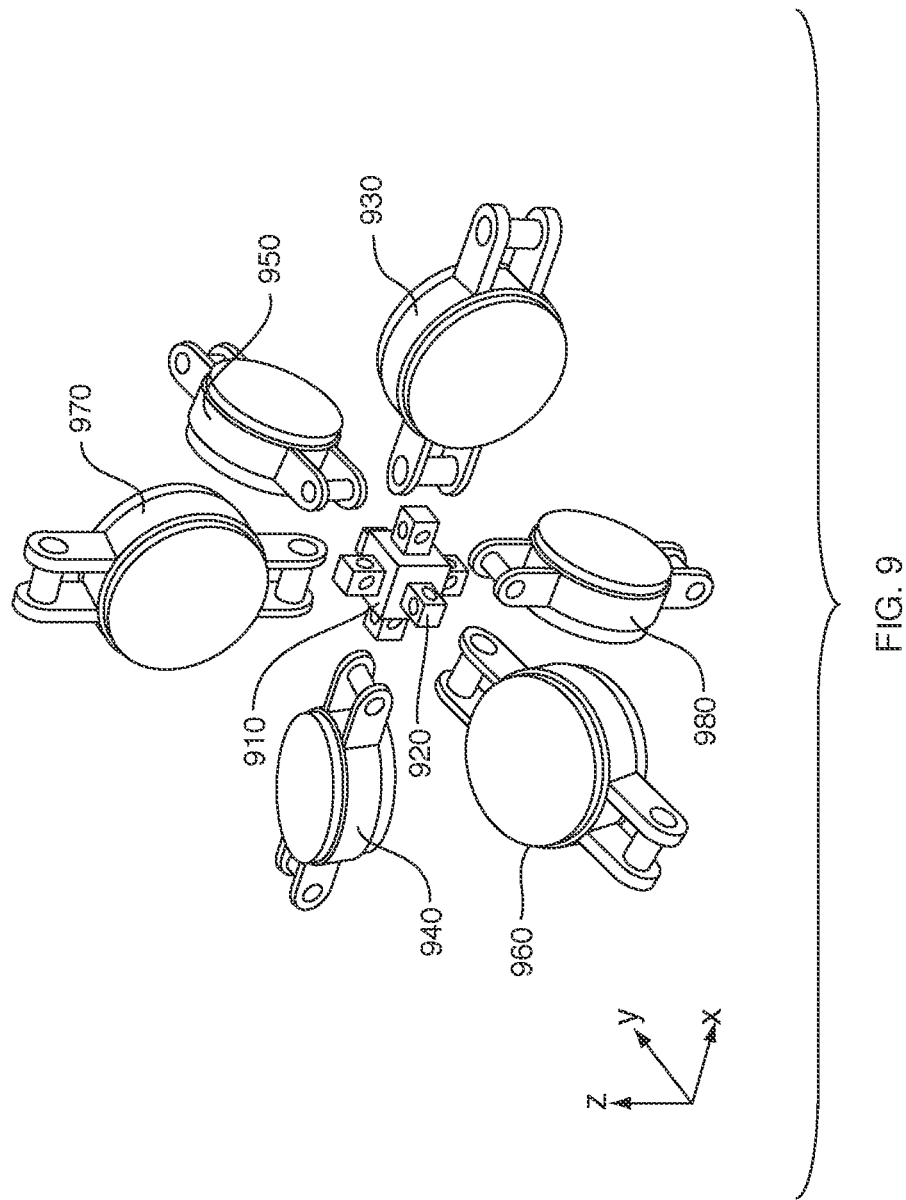
FIG. 9 is an exploded diagram of an exemplary embodiment of a cellular automotion volume assembly, according to one aspect of the invention.

The individual units used for a cellular automotion volume device are the same as those used in the cellular automata surface device, shown in FIGS. 6A-D, except that the planar four-unit connecting elastomeric node is replaced with a three-dimensional six-unit connecting elastomeric node, as shown in FIG. 9. Shown in FIG. 9 is elastomeric node 910 with six connections 920 for accepting the six subassemblies, X1 actuator 930, X2 actuator 940, Y1 actuator 950, Y2 actuator 960, Z1 actuator 970, and Z2 actuator 980.

Figure 10:
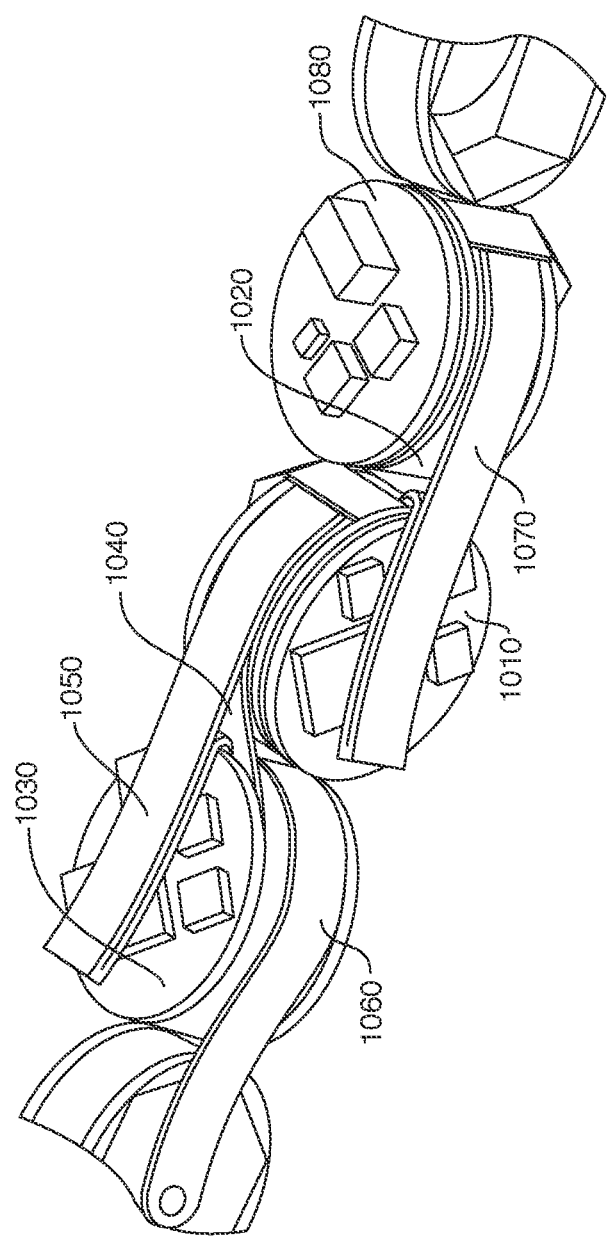
FIG. 10 depicts an exemplary embodiment of power and data transfer between cellular automotion string units, according to one aspect of the invention.

In some embodiments, flexible interconnecting wires may be added if the system is not designed to harvest its own power and perform wireless communications. FIG. 10 depicts an exemplary embodiment of power and data transfer between cellular automotion string units. Wires to carry power and communications may then follow the rigid connection from the strut/housing to the rotor, and via flexible cabling between units. As seen in FIG. 10, processor board III 1010 remains stationary relative to housing III 1020, and together they rotate relative to processor board II 1030 and housing II 1040, so the free loop of cabling "II-III" 1050 is free to roll back and forth along one axis, similar to a printer ribbon cable. Also shown are housing 11060, cabling "III-IV" 1070, and processor IV 1080.

The conformation and locomotion of the cellular automotion volume, i.e. global programmed shape and motion, is achieved through local actuation of the individual units. In a preferred embodiment, the control of these individual units is achieved through cellular logic automata control, whereby each unit contains minimal processing power in order to handle a low number of digital states and the global configuration and locomotion is a result of the information flow through the system, as defined by the pre-programmable and re-programmable system of states of the device. Units in the cellular automotion volume are connected to as many other units as are defined in the three-dimensional topology—six, in the example shown.

It may be desirable to alter the range of global configurations by changing the relative rotational position of the connection to adjacent units, in terms of yaw, pitch and roll, as well as the relative lengths of the connecting struts. The topology of a cellular automotion device may be any volume filling meshing, with arbitrary node connectivity, as necessary to achieve desired range of configurations.

It should be clear to a person skilled in the art that many physical processor, elastic joint, or drive variants are possible. Interconnect, for communication between units would vary appropriately. For example, conventional microprocessors may be used, with optical interconnect, or bubble logic (hydrodynamic flow field) processors with flexible tubular interconnect may be used for applications where tolerance to electromagnetic noise is a concern. For actuators, hydraulic motors may be used in applications at the meter length scale, or bi-stable electromagnetic motors may be used in applications at the nanometer length scale.

Figure 11:
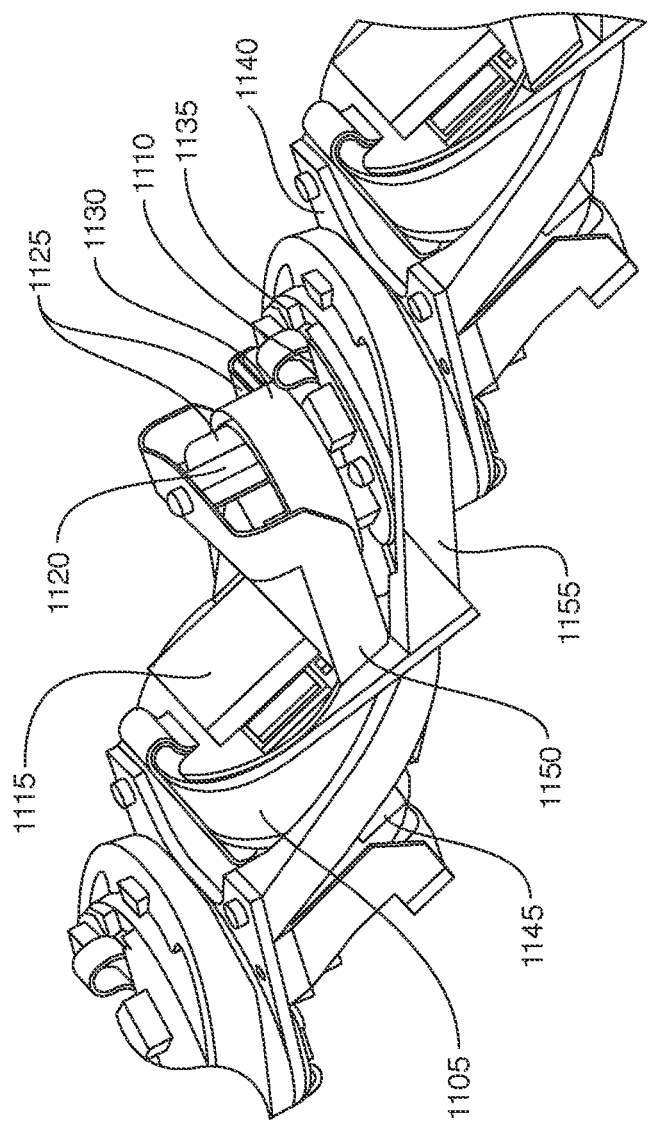
FIG. 11 is an exemplary embodiment of a cellular automotion string based on hexagonally-bisected cube geometry, according to one aspect of the invention.
Figure 12:
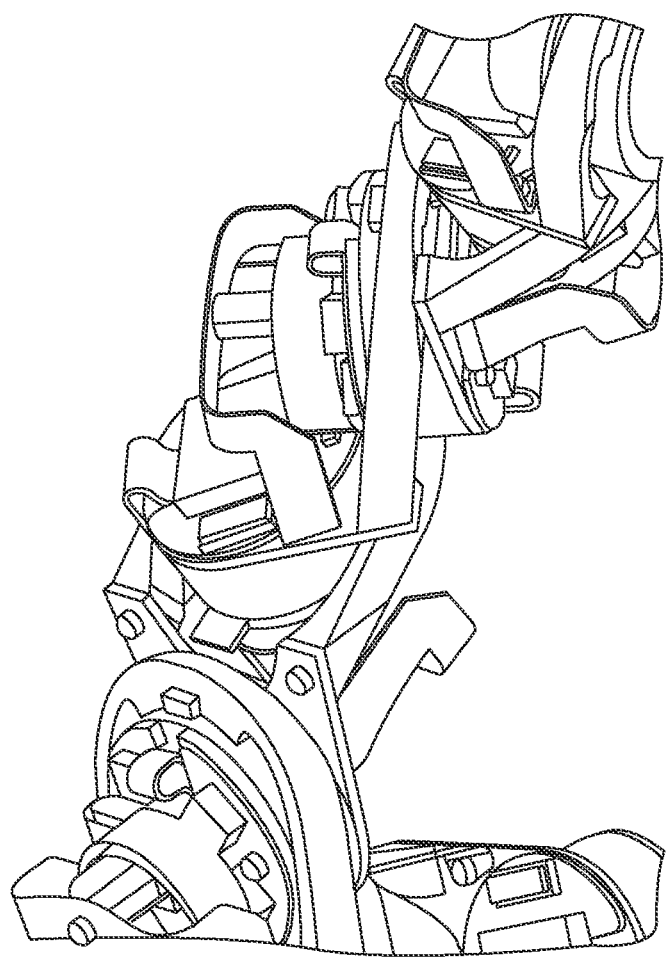
FIG. 12 is an exemplary embodiment of a cellular automotion string based on hexagonally-bisected cube geometry in a folded configuration, according to one aspect of the invention.

In a preferred embodiment, a cellular automotion device according to the present invention is based on a hexagonally-bisected cube geometry, as shown in FIGS. 11 and 12 for a cellular automotion string. In FIG. 11, the string is straight, while in FIG. 12, the string is folded into a shape. Shown in FIG. 11 are motor 1105, motor driver 110, processor 1115, encoder magnet 1120, cable carrier 1125, flex cable coil 1130, top bushing 1135, bottom bushing 1140, energy storage unit 1145, cable cover 1150, and rotor joiner 1155.

The exemplary string of FIGS. 11 and 12 consists of a series of joint motors. In a preferred embodiment, these are coaxially-geared electropermanent wobble stepper motors, such as, but not limited to, those described in co-pending U.S. patent application Ser. No. 12/695,155, which is herein incorporated by reference in its entirety, which are preferred for their ability to exert torque at low speeds with low power consumption, but it will be clear to one of skill in the art of the invention that any type of motor, such as, but not limited to, a geared servo motor, may also be used.

The joint motors alternate orientations. Their axes share a common plane, but are inclined at approximately 109.57 degrees from each other, so that the string has the hexagonally-bisected cube geometry. In this embodiment, specially-shaped bottom bushing 1140 and rotor joiner 1155 form the mechanical structure of the string. In a preferred embodiment, the mechanical parts are made of 932 Bearing-Grade Bronze, selected for its self-lubricating properties and ease of machinability, but it will be clear to one of skill in the art that many other materials, such as, but not limited to, aluminum, titanium, stainless steel, brass, and other metals and polymers could be used.

Figure 13:
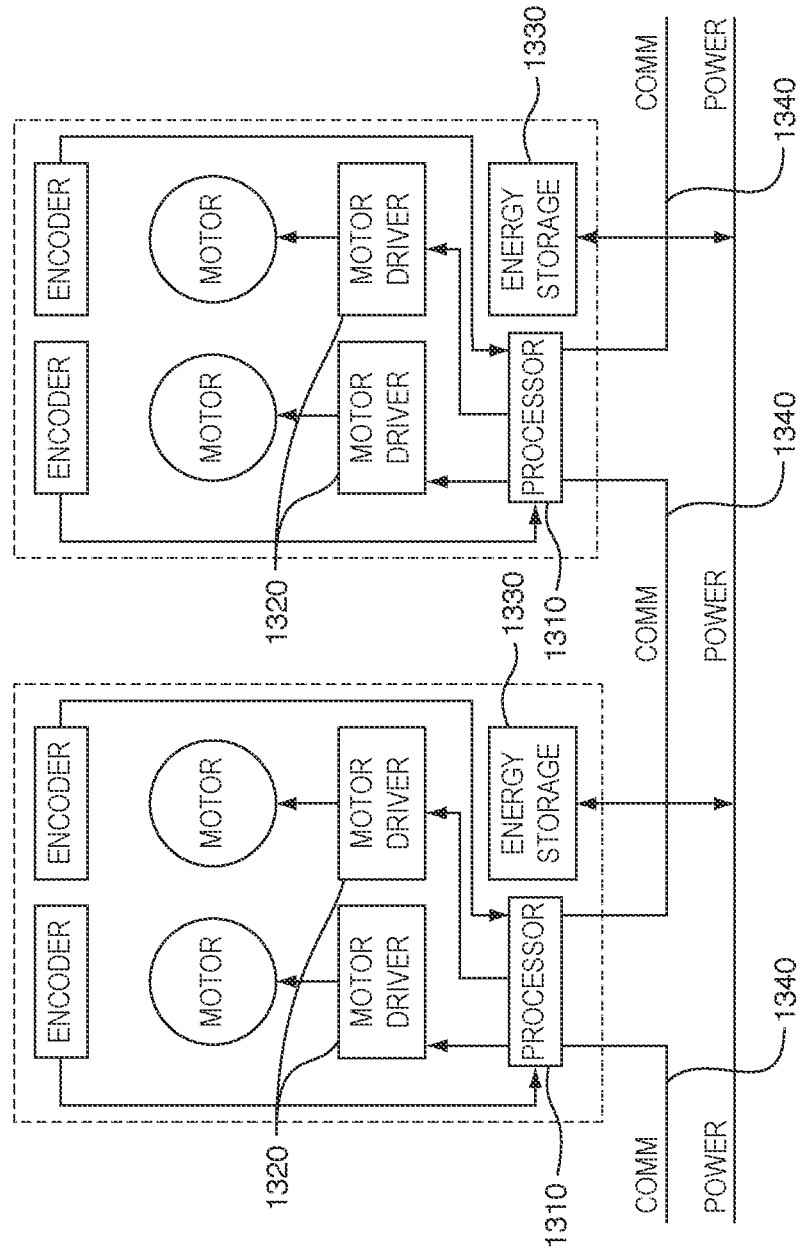
FIG. 13 is a block diagram of an exemplary embodiment of electronics for an exemplary cellular automotion string with two motors per processor, according to one aspect of the invention.
Figure 14:
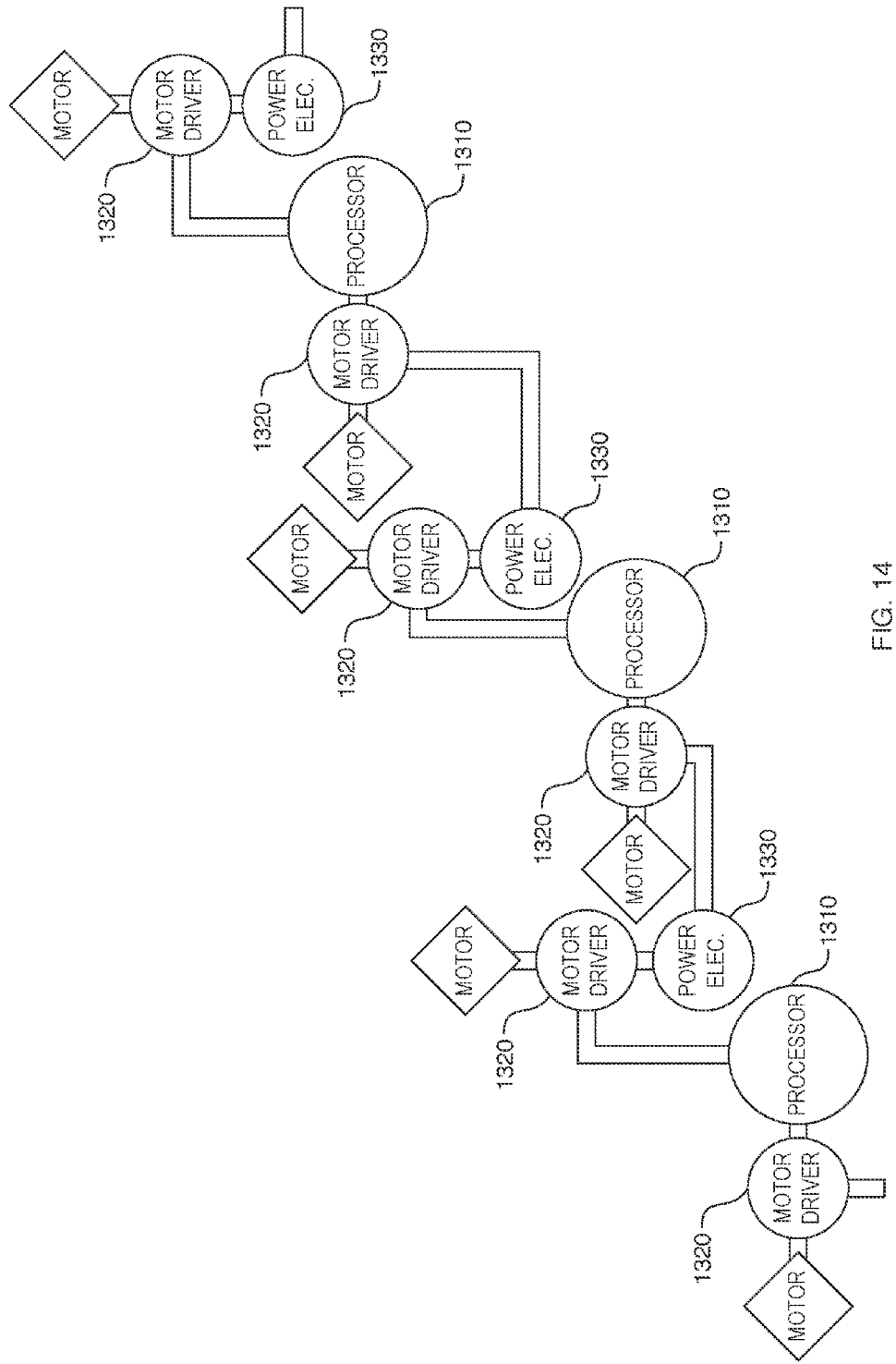
FIG. 14 is an exemplary embodiment of a flat pattern for the continuous flex circuit for a cellular automotion string with hexagonally-bisected cube geometry, according to one aspect of the invention.

Wrapped around the string of motors is a flexible circuit. In a preferred embodiment the flexible circuit is made of copper-on-Kapton, but many other combinations of conductive and dielectric materials could be used instead. A block diagram of the circuitry for a preferred embodiment is shown in FIG. 13 and a flat-pattern for the circuit before wrapping is shown in FIG. 14. The circuit for a long string can be assembled flat using a conventional pick-and-place machine before wrapping.

In a preferred embodiment, the circuit consists of circular sections connected by flexible circuit jumpers. As shown in FIG. 13, there are three types of boards in the repeating sequence: processor board 1310, motor driver board 1320, and power electronics board 1330, which alternate as shown in FIG. 14. In this way, every motor driver board 1320 is situated between a processor board 1310 for control, and a power electronics board 1330 for power storage. In some embodiments, each processor board 1310 communicates with its neighbors via wired TTL-level serial communication 1340, although it will be clear to one of skill in the art that many other methods of communication could be advantageously used in the invention. Also, many other ordering arrangements of the electronics on the flex circuit could be made.

In a preferred embodiment, the motor driver board uses an array of power field-effect transistors to switch the high-current, short-duration pulses required by the electropermanent stepper motor. The pulse energy is stored in a capacitor on the power electronics board. In a preferred embodiment, a tantalum capacitor is used for power storage, but it will be clear to one of skill in the art of the invention that many types of capacitors, such as, but not limited to, ceramic, electrolytic, or carbon aerogel could be advantageously used in the invention, and that electrochemical batteries, such as, but not limited to, lithium-polymer batteries or nickel-metal-hydride batteries could alternatively be used.

In some embodiments, connections between adjacent modules are made using a coil-spring section of flexible cable, integrated into the continuous pattern. A cable cover keeps the cable from getting tangled with the cable from other nodes, although there are many other ways to accomplish this, such as, but not limited to, using a stiffer cable, and so this is an optional component. Descending from the cable cover is a rod with a permanent-magnet on the end. At the center of the motor driver board is a two-axis Hall-effect sensor chip. When a module rotates, the permanent magnet rotates relative to the Hall-effect sensors, and so this combination forms an absolute position encoder. In will be apparent to one skilled in the art that there are many other ways to accomplish position feedback, such as, but not limited to, optical encoders, magnetic encoders using magnetoresistive sensors, electric-field encoders, potentiometers, or limit switches. Also, relative position sensing or dead-reckoning may be sufficient for some applications.

A variation on any of the embodiments listed above is the addition of bistable joints, such as, for example, placing detents into the bearings so that the joints snap into place at certain preferred angles. In an extreme case, the motors and control apparatus may be removed from the string entirely, and the string may be folded externally, for example by a robot arm. Alternatively, the string may retain actuation capability, but have greater holding strength in the final positions. In addition, when folded into shapes, particular parts of the modules come into close proximity with each other. In some embodiments, the addition of mechanical tabs and slots, magnets, switchable magnets, electrostatic plates, or other mechanical holding devices at these locations may be advantageous, because it will allow the resulting shapes to have increased strength.

Although the foregoing description has focused on two folding geometries, the orthogonal alternating-axis geometry and the hexagonally-bisected cube geometry, it will be clear to one of skill in the art that other folding geometries may be advantageously employed with the invention. The art of packing shapes in space is a well-studied mathematical problem, and one skilled in the art could easily envision many other axis patterns for implementing a cellular automotion system that would still retain the essential features of the present invention.

The mechanical parts shown in the attached drawings are shown with particular shapes, such as rounded shapes or angular shapes. However, it will be clear to one of skill in the art of the invention that there is a wide latitude in the particular shapes used for the parts of a cellular automotion string, surface, or volume, and that a person skilled in the art could design a string, surface, or volume with a different visual appearance that nonetheless retained the essential features of the present invention, such as, but not limited to, a periodic repeating pattern of joints, including either actuation capability and control logic, or mechanical bistability, or both.

While a preferred embodiment is disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. A cellular automotion unit, comprising:
    an actuated joint, the actuated joint having a single degree of freedom and comprising:
        a unit controller configured for controlling and driving actuation of the cellular automotion unit;
        a joint actuator, the joint actuator comprising:
            an inner active portion; and
            an outer passive portion; the inner active portion and outer passive portion together comprising a motor and being controllably rotatable relative to each other under the control of the unit controller; and
        a linkage element, the linkage element comprising:
            a main strut portion; and
            a joint actuator housing portion, the linkage element being connected to the joint actuator by a pin connector;
        wherein, when the outer passive portion of the joint actuator is inserted into the joint actuator housing portion of a second instance of the cellular automotion unit and the joint actuator housing portion is housing an actuator portion of a third instance of the cellular automotion unit, the opening in the main strut portion is rotated about the axis of symmetry of the cellular automotion unit relative to the opening in the joint actuator housing portion so that the alignment of the cellular automotion unit is rotated with respect to the alignment of the second and third instances of the cellular automotion unit.

2. The cellular automotion unit of claim 1, wherein the unit controller comprises an on-board processor.

3. The cellular automotion unit of claim 1, further comprising communications circuitry.

4. The cellular automotion unit of claim 2, further comprising communications circuitry.

5. The cellular automotion unit of claim 1, wherein the actuator is an electropermanent motor.

6. The cellular automotion unit of claim 1, wherein the opening in the strut portion is rotated 90 degrees about the axis of symmetry of the cellular automotion unit relative to the opening in the joint actuator housing portion.

7. The cellular automotion unit of claim 1, wherein the cellular automotion unit is in the form of a hexagonally-bisected cube.

8. The cellular automotion unit of claim 1, wherein the cellular automotion unit is in the form of a right-angle tetrahedron.

9. A cellular automotion device, comprising:
    a continuous structure comprising a plurality of discrete cellular automotion cells, wherein each cellular automotion cell is linked to at least one adjacent cellular automotion cell and has a range of motion that is rotated with respect to the range of motion of the cellular automotion cells to which it is linked, each cellular automotion cell comprising:
        an actuated joint, the actuated joint having a single degree of freedom and comprising:
            a cell controller configured for controlling and driving actuation of the cellular automotion cell;
            a joint actuator, the joint actuator comprising:
                an inner active portion; and
                an outer passive portion; the inner active portion and outer passive portion together comprising a motor and being controllably rotatable relative to each other under the control of the cell controller; and
            a linkage element, the linkage element comprising;
                a main strut portion; and
                a joint actuator housing portion, the linkage element being connected to the joint actuator by a pin connector;
            wherein, when the outer passive portion of the joint actuator is inserted into the joint actuator housing portion of a second cellular automotion cell and the joint actuator housing portion is housing an actuator portion of a third cellular automotion cell, the opening in the main strut portion is rotated about the axis of symmetry of the cellular automotion cell relative to the opening in the joint actuator housing portion so as to cause the alignment of the cellular automotion cell to be rotated with respect to the alignment of the second and third cellular automation cells.

10. The cellular automotion device of claim 9, wherein the cellular automation cells are identical.

11. The cellular automotion device of claim 9, wherein the cellular automation cells are linked together into a chain such that the device is a cellular automotion string.

12. The cellular automotion device of claim 9, wherein at least some cellular automotion cells are linked to each other by passive elastic nodes.

13. The cellular automotion device of claim 9, further comprising a plurality of passive elastic nodes, each passive elastic node being connected to at least two cellular automotion cells, the passive elastic node providing the cellular automotion device with a branching topological arrangement of cellular automotion cells.

14. The cellular automotion device of claim 13, wherein the cellular automation cells and passive elastic nodes are linked together into a two-dimensional shape such that the device is a cellular automotion surface.

15. The cellular automotion device of claim 14, wherein all cellular automotion cells actuate in a direction that is normal to the surface, such that actuation of adjacent cells in the same direction results in global folds in the surface and actuation in alternating directions results in reduction of linear dimension along the surface.

16. The cellular automotion device of claim 13, wherein the cellular automation cells and passive elastic nodes are linked together into a three-dimensional lattice such that the device is a cellular automotion volume.

17. The cellular automotion device of claim 9, wherein the cell controller of each cellular automotion cell is an on-board processor.

18. The cellular automotion device of claim 9, each cellular automotion cell further comprising communications circuitry.

19. The cellular automotion device of claim 9, wherein each cellular automotion cell is in the form of a hexagonally-bisected cube.

* * * * *